(No Model.)
W. S. RICHARDSON.
FASTENING FOR GLOVES, &c.
No. 300,509. Patented June 17, 1884.
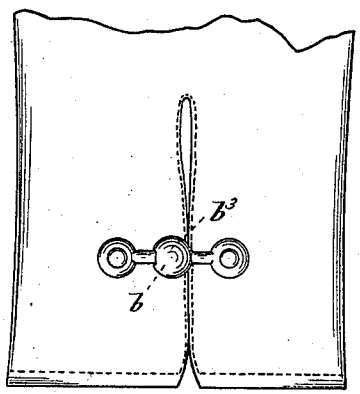
Fig. 1.
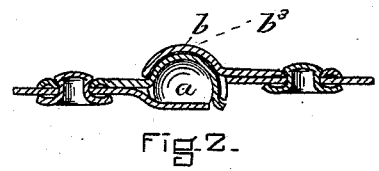
Fig. 2.
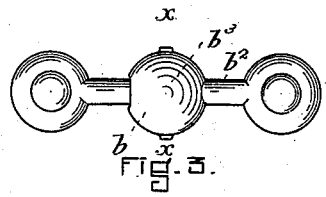
Fig. 3.
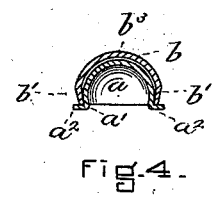
Fig. 4.
Fig. 8.
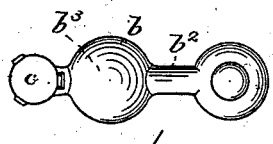
Fig. 6.
Fig. 5.
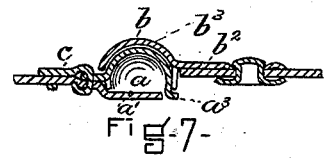
Fig. 7.
WITNESSES
Fred. Harris
Fred. P. Dolan
INVENTOR
Wm. S. Richardson
by his attys
Clarke & Raymond

UNITED STATES PATENT OFFICE.

WILLIAM S. RICHARDSON, OF BOSTON, MASSACHUSETTS, ASSIGNOR TO THE BALL AND SOCKET FASTENER COMPANY, OF NASHUA, NEW HAMPSHIRE.

FASTENING FOR GLOVES, &c.

SPECIFICATION forming part of Letters Patent No. 300,509, dated June 17, 1884.

Application filed December 19, 1883. (No model.)

*To all whom it may concern:*

Be it known that I, WILLIAM S. RICHARDSON, of Boston, in the county of Suffolk and State of Massachusetts, have invented a new and useful Improvement in Fastenings for Gloves and other Articles, of which the following is a full, clear, and exact description, reference being had to the accompanying drawings, forming a part of this specification in explaining its nature, in which—

Figure 1 is a plan view of the wrist of a glove showing my invention in place. Fig. 2 is a vertical central section of the two members of the fastening riveted to material and engaged with each other. Fig. 3 is a plan view of the fastening. Fig. 4 is a cross-section on the line $x$ $x$ of Fig. 3. Fig. 5 is a vertical section showing a modification. Fig. 6 is a plan view, and Fig. 7 a sectional view, of a variation in the manner of attaching the ball member. Fig. 8 is a plan view of the ball detached.

The invention is an improvement upon that described in my Letters Patent No. 276,714, dated May 1, 1883; and it consists, especially, in the arrangement of the ball and socket members of the fastening described in said patent, whereby the socket member of the fastening is made to cover the upper and side surfaces of the ball member, and is made available for ornamentation and the strength of its holding arm or shank increased.

In practicing this invention the ball member $a$ may be spherical, as described in said patent, or it may have a flat under surface, $a'$, as shown in Figs. 2, 4, 5, and 7; and on some accounts I prefer this construction, as the ball is thereby prevented from tipping, being supported on the article to which it is attached by its flat base. The socket member $b$ has yielding sides $b'$, and is like the socket member described in said patent, with the exception that the shank $b^2$ is curved in a direction opposite to that shown and described in said patent, and the upper portion, $b^3$, thereof provides means whereby an ornamental finish can be given the fastening. This shape of the shank increases its strength, especially at its junction with the socket. Suitable ornamentation can be given the upper surface, $b^3$, of the socket by stamping in dies or otherwise. In order that the socket may not turn too far laterally upon the ball member, when a ball member having a flat under surface is used, I provide the same with stops or projections $a^2$, which extend outwardly from the under edge thereof; and the same result is obtained by forming a cavity in the top of the ball and striking down a corresponding portion of the socket member to enter the cavity and act as a stop in preventing this lateral movement of the socket in relation to the ball.

For the purpose of easily separating the two parts of the fastening by a downward pressure of the finger and thumb, I have provided the ball member with the projection $a^3$, which is adapted to bear on the edge of the socket when the two arms or shanks of the fastening are pressed downward, and it acts as a fulcrum, and, in connection with the shank of the ball member, forms a lever of the second order, whereby the ball is easily removed from the socket.

Of course the shape of the sides of the socket and the shape of the ball member may be changed to any other desired form without conflicting with the spirit of the invention; and it is obvious that the ball member may be fastened in place by other means than a shank extending backward from it; and I have shown in Figs. 6 and 7 the shank curved and forming a ring through which the separate pronged fastening $c$ is passed.

Aside from the improvement in the construction of the socket member which provides for greater strength and the opportunity for ornamentation by its upper surface, another advantage from this application or form of the invention is gained in that the opening of the socket is covered or protected, so that dust, dirt, or lint cannot enter the socket while it is in use, and thus renders the fastening very available for use on boots and shoes and in other exposed places.

Probably the best form of flat seat $a'$ is the annular or circular, shown in the figure, as a saving in metal is obtained; but of course the seat may be continuous and integral with the remainder of the ball, if desired.

In some instances when the fastening is used on flexible material, the ball member of the fastening will be tipped with the socket member in disengaging them; but when the material is not flexible the socket member will be the one to be removed, as it is the one which is put on, and in this event the socket member will find its fulcrum on the projection $a^3$ of the ball, and thus becomes a lever of the first order. Of course the upper surface of the socket may not be continuous, and when so formed a saving in stock can be made, and at the same time an ornamental appearance given to it.

Having thus fully described my invention, I claim and desire to secure by Letters Patent of the United States—

1. In a fastening for gloves and other articles, the ball member thereof fastened to the article on which it is used, substantially as described, with a socket member also fastened to such article, and having, when so fastened, its mouth toward the surface of the article, whereby it is adapted to be shut over the ball and cover or partly cover it, as specified, substantially as and for the purposes set forth.

2. A ball member of a fastening device having the flat under surface, $a'$, adapted to rest upon the surface of the material to which the ball is attached and steady the same thereon, all substantially as and for the purposes described.

3. In a fastening for gloves and other articles, a ball member having the stops or projections $a^2$, in combination with a socket member, all substantially as and for the purposes described.

4. In a fastening for gloves and other articles, the combination of the ball member having the fulcrum projection $a^3$ and a socket member adapted to shut upon and inclose the ball member of the fastening, all substantially as and for the purposes described.

5. In a fastening device for gloves and other articles, the socket member having the upper surface adapted to be ornamented, and downwardly-extending yielding sides adapted to inclose the other member of the fastening device upon its edge and upper surface, all substantially as and for the purposes described.

6. A socket member of a fastening device having the yielding sides $b'$, the arm or shank $b^2$, curved in cross-section, as described, all substantially as and for the purposes set forth.

WILLIAM S. RICHARDSON.

Witnesses:
  F. F. RAYMOND, 2d,
  FRED. B. DOLAN.